E. S. CHURCH.
CASH REGISTER.
APPLICATION FILED JUNE 8, 1906.

1,047,749.

Patented Dec. 17, 1912.

Witnesses

Inventor
Edmund S. Church
by J. B. Hayward
and R. Glass
Attorneys

E. S. CHURCH.
CASH REGISTER.
APPLICATION FILED JUNE 8, 1906.

1,047,749.

Patented Dec. 17, 1912.
6 SHEETS—SHEET 6.

UNITED STATES PATENT OFFICE.

EDMUND S. CHURCH, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,047,749.

Specification of Letters Patent.   Patented Dec. 17, 1912.

Application filed June 8, 1906.  Serial No. 320,795.

*To all whom it may concern:*

Be it known that I, EDMUND S. CHURCH, a citizen of the United States, residing at Dayton, in the county of Montgomery and State of Ohio, have invented certain new and useful Improvements in Cash-Registers, of which I declare the following to be a full, clear, and exact description.

The invention relates to cash registers, and has among its objects to provide an improved machine of this type adapted to receive a number of kinds of entries.

The machine produced is what may be termed a "duplex cash register;" that is, one consisting of a plurality of registering devices, and an equal number of sets of controlling devices therefor, with a common operating device.

The invention also comprises means for preventing the use of more than one department of the duplex machine at the same operation.

As a matter of further improvement, means are provided for requiring the depression of an initial or transaction key, as well as amount keys, at each operation, and in the present embodiment this result is produced by a machine lock which requires the use of the said two varieties of keys to release the lock.

The usual shutter or flash is provided, but there has been added to its usual concealing function a second function, to wit, that of a clerk's or transaction indicator.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Of said drawings.

The improvements are shown as adapted for use in connection with a machine of the type shown in Letters Patent of the United States issued to J. P. Cleal and F. A. Reinhard, No. 580,378, April 13, 1897. This patent describes a machine of the so-called two-motion type; that is, one in which keys or their equivalent serve to determine the differential motion of the actuating devices for the register proper, the power being furnished by a crank-handle. This mechanism has been duplicated, but the duplex machine has been adapted for use with a single operating handle. Means are provided for preventing the use of the two departments at the same operation. The machine is intended in general to be used by two separate clerks, or for two separate departments. In such case, each clerk or each department would be assigned one of the parts of the duplex machine. The operation of any key in either department serves immediately to lock the keys of the other department from operation. The machine is normally locked, and in order to unlock the same, it is necessary to press not only an amount key, but also a clerk's or transaction key, the combined operation of the two serving to unlock the machine. As an indication of which clerk's key has been operated, a clerk's indicator is provided, under the control of the said keys, and inasmuch as only one clerk will use the machine at any one time, the clerks' indicators are also used in place of the usual shutter or flash.

Described in general terms, the machine comprises a frame 10, (see Fig. 2) carrying a main rod 11, on which are journaled a plurality of segments 12. These segments carry rack-teeth 13, meshing with a gear 14, on the shaft 14ª which also meshes with a second gear 15, rigid with an indicator 16. A bank of keys 17 is provided for each segment 12, and these keys when depressed are adapted to limit the motion of the segment. The motion is primarily caused by a segment 18, also journaled on the rod 11, and connected to which is a crank 19. This crank, through a link 20 and a second crank 21, is moved by the rotation of main shaft 22, which is given a complete rotation at each operation of the machine. It will be understood that there is a plurality of banks of keys, and an equal number of segments 12 and coöperating parts in the machine.

Figure 2:
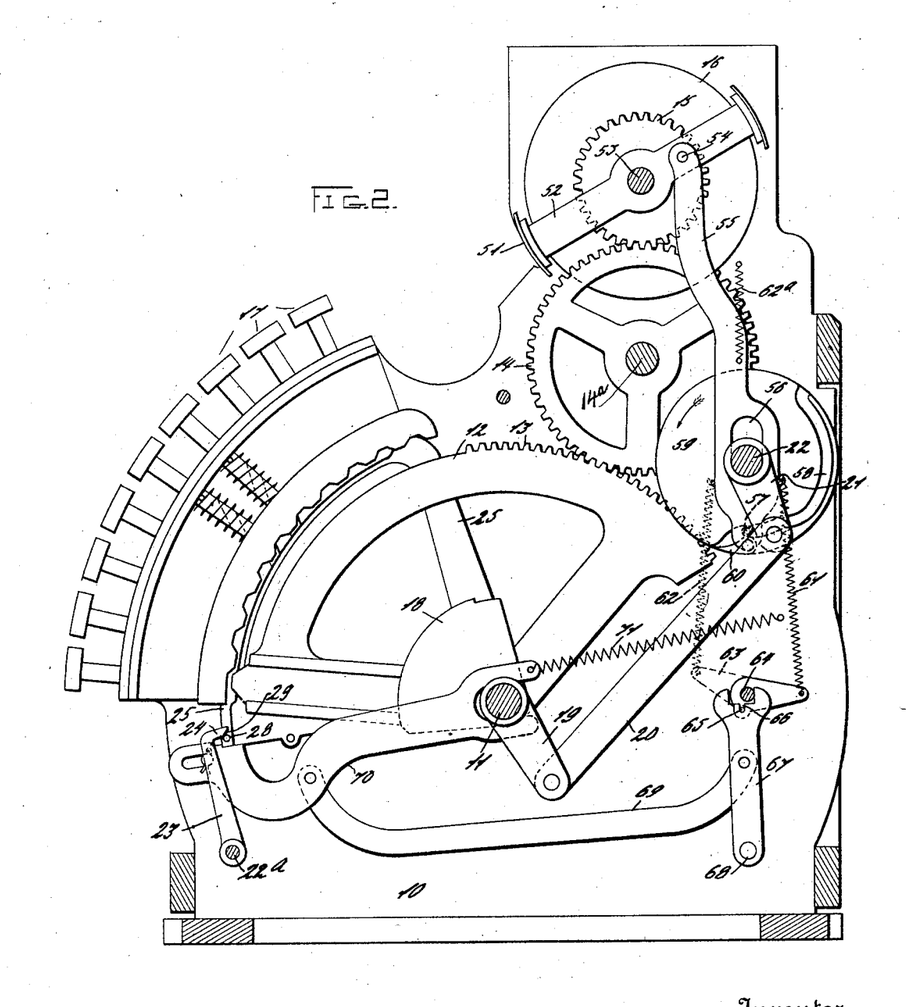
Fig. 2 is a transverse section on the line 2—2 of Fig. 1.
Figure 3:
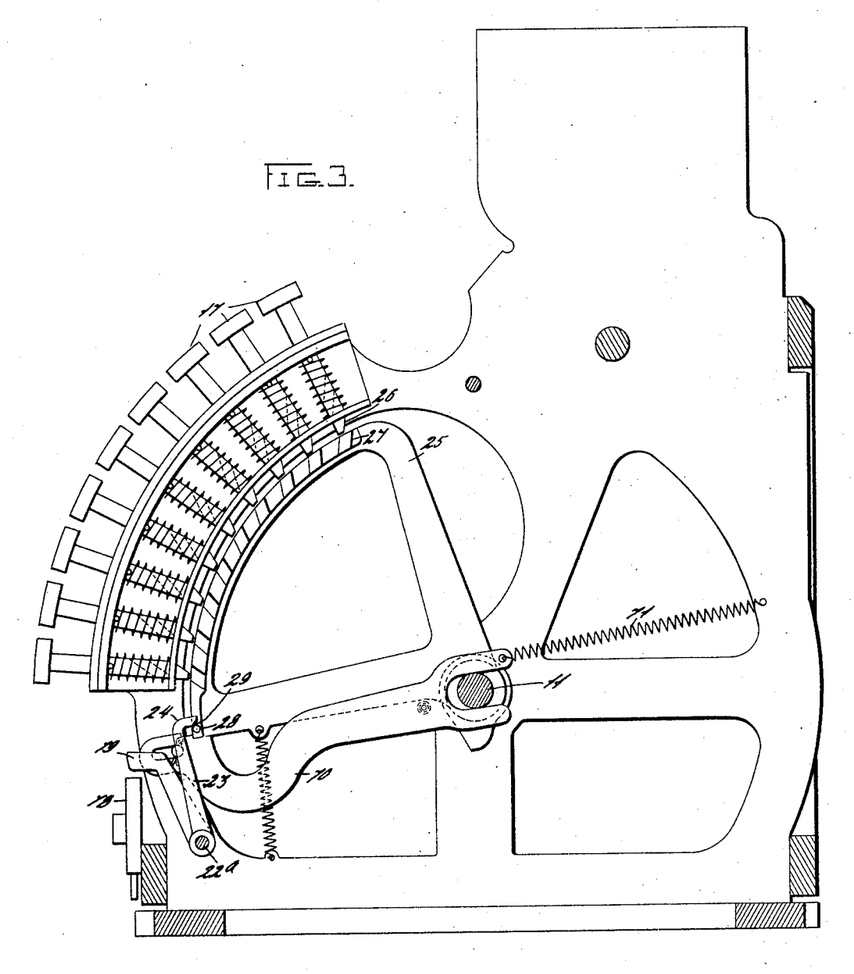
Fig. 3 is a similar section on the line 3—3 of Fig. 1.
Figure 4:
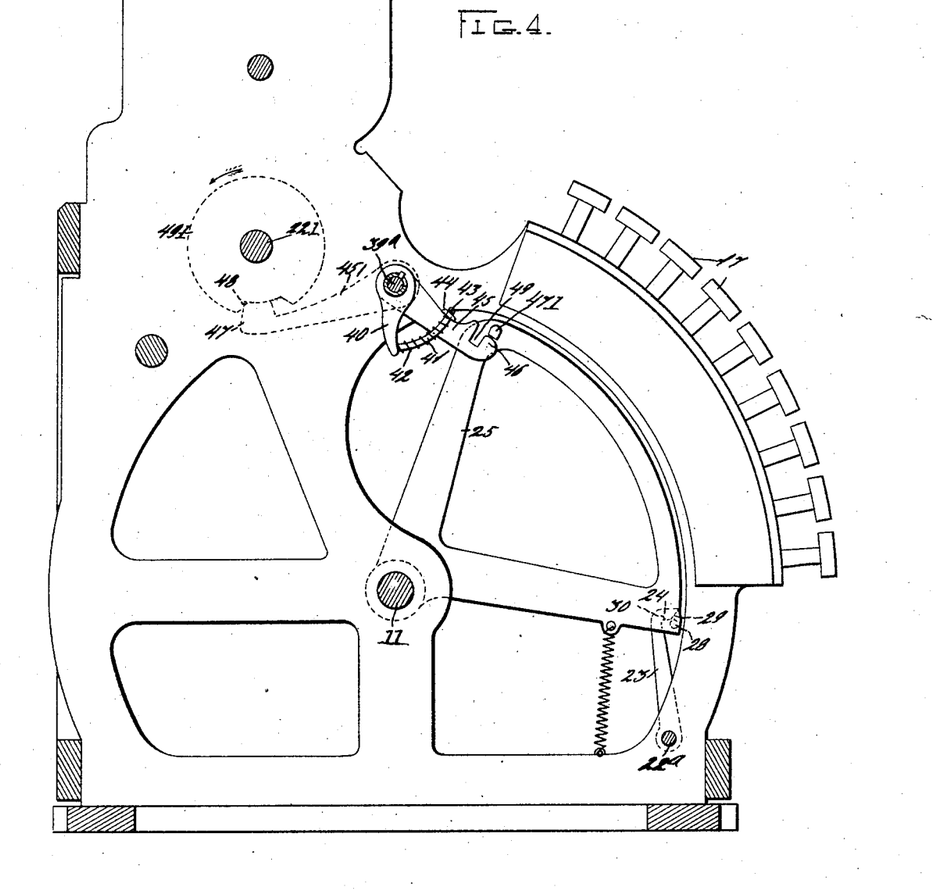
Fig. 4 is a section on the line 4—4 of Fig. 1, but looking in the opposite direction.
Figures 5, 6:
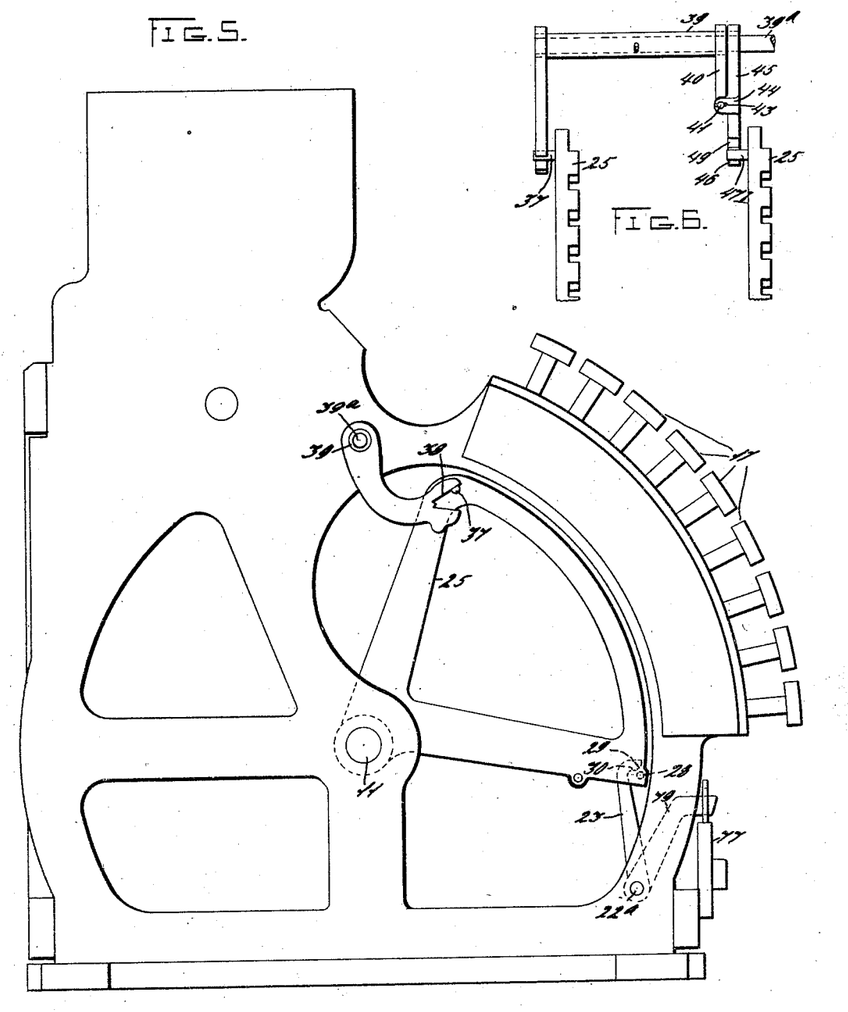
Fig. 5 is a section on the line 5—5 of Fig. 1, similar to Fig. 4.
Fig. 6 is a detail of the unlocking device.

To provide for the interlocking of the two halves of the duplex machine, the mechanism shown in Figs. 3 and 4 is provided. A rod 22ª has rigid therewith a plurality of detents 23. Those for the right-hand half of the machine have hooks 24 projecting rearwardly, and those detents 23 of the left-hand half of the machine have hooks 24 projecting forwardly, as shown in Figs. 4 and 5. These detents form a rigid structure, and are adapted to be moved as a whole by the oscillation of the segmental detents 25 used in this type of machine. The keys 17 are provided with bevels 26 (see Fig. 3) adapted to abut beveled slots 27 in the detents 25 and raise the said detents when the keys are depressed. It will be evident from the structure of the detents 23 that when the detents 25 are raised, pins 28 carried thereby will rock the detents 23 by means of the beveled parts 29 of the hooks 24. Supposing the detent 23 to be rocked forwardly, as shown in Figs. 2 and 3, it is evident that this forward rocking will carry the straight portion 30 of the detent 23, shown in Figs. 4 and 5, directly over the pin 28 on the segmental detent 25. This evidently provides for locking the keys, as above stated, inasmuch as a depression of the key necessitates a raising of the detent 25, corresponding to the particular bank, but such raising is prevented by the forward movement of the detent 23. It will therefore be evident that the first of the above-mentioned objects is provided for by this structure. When any key of the right-hand half of the machine is operated, the detents 23 are moved forwardly, and the left-hand half of the machine is thereby locked out of operation, but the remaining banks in the right-hand half may still be used.

To compel a depression of an amount key and a transaction or clerk's key at each operation, the mechanism shown in Figs. 4 and 5 has been provided. As above stated, the segmental detent 25 corresponding to a given bank of keys is raised when any key in that bank is depressed. The detents for the amount banks have each a pin 37 near the upper part thereof, adapted to abut and move a curved lever 38, rigidly carried by a sleeve 39, loose on a shaft 39ª. On this sleeve is also a lever 40, having a curved projection 41, about which is coiled a spring 42. The outer end of the curved projection 41 is pierced by a pin 43, against which bears a flange 44 on a lever 45 tight on the said shaft 39ª. As shown in Fig. 6, there is a pin and slot connection between sleeve 39 and shaft 39ª. A lever 451 is rigidly mounted on and extends rearwardly from the shaft 39ª, and at the extreme end thereof has a projection 47 adapted to engage a notch 48 in a disk 49, rigid with the shaft 221. When an amount key is depressed, pin 37 on the detent 25, Fig. 5, will then rock lever 38, thereby rocking sleeve 39 and lever 40. This movement of lever 40 will tension spring 42, inasmuch as the lever 45 has a projection 46 abutting a pin 471 on the segmental detent 25 corresponding to the clerk's keys. When a key in the clerk's bank is operated, the lug or pin 471 will be raised into line with the notch 49 on the lever 45, and the tension of spring 42 will then rock levers 45 and 451, thereby withdrawing the projection 47 from the notch 48 of the disk 491, and unlocking the machine. It will be evident that with this structure the amount key may be depressed before the clerk's key, or the reverse may occur, or they may both be depressed together. In the first case the lever 38 would be first rocked, and the operation will be as was previously stated. If the clerk's key is pressed first, the lug 47 will be moved in line with the notch 49, but lever 45 will not move, as spring 42 is not then under tension. When the amount key is then depressed, the spring 42 will cause an operation of lever 45, and unlock the machine. It will be evident that if both keys are depressed at once, the same ultimate result will be produced.

With the particular style of duplex machine herein shown, the above described control for the main operating mechanism can be applied to one section only of the machine for the obvious reason that if both sections were equipped with this style of control the detent coöperating with the clerk's keys of the unoperated section would prevent the rocking of shaft 39ª by the lug 471 of said detent engaging with the projection 46 of its companion arm 45. For this reason the above described control is shown in connection with the left hand end or clerk's A section only, the clerk's detent of the other section unlocking the main operating mechanism by rocking the shaft 39ª in a manner similar to that shown in the aforementioned Cleal and Reinhard patent.

It is usual in this type of machine to provide what is termed in the art a "flash," or "shutter," to compel a complete operation of the machine. If the machine is only partially operated, the flash will remain in concealing position and prevent an observer from seeing the indicators. It is also somewhat usual to provide an operator or clerk's indicator in addition to the value indicators, in order to show the person operating the machine. Mechanism is provided whereby both these functions are performed with a single structure, this mechanism being shown in Figs. 1, 2 and 7.

It is evident that only one of the clerks' indicators will be used at any one operation, but it is also necessary that both of the indicators (with regard to their concealing function) should be moved to concealing position at each operation. To accomplish this dual result, mechanism is provided whereby the flashes are both moved to concealing position at the beginning of any operation of the machine, and at the end of the operation one or the other of the flashes, depending on the clerk's key depressed, is withdrawn.

Figure 7:
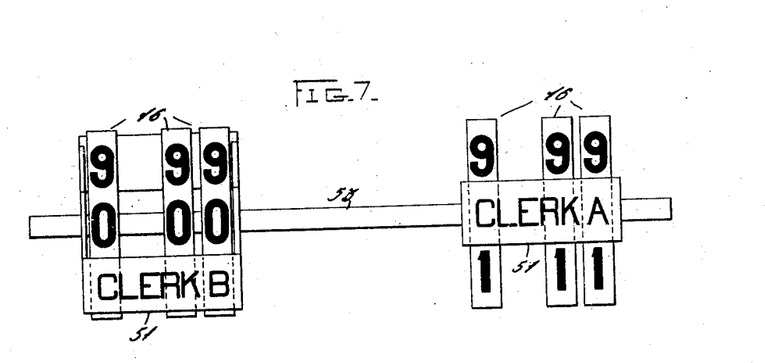
Fig. 7 is an elevation of the indicating mechanism.

On reference to Figs. 2 and 7 it will be seen that flashes 51 are provided one for each of the duplicate sets of indicators, these flashes being carried by frames 52 journaled on the indicator supporting shaft 53. Connected to each flash by pins 54 are links 55 having slots 56 straddling the operating shaft 22 and near the bottom of each link 55 is an antifriction roller 57 adapted to move in cam slots 58 in one of two disks 59 rigidly mounted on said shaft 22, the cam slots 58 extending only part way around the disks as shown, and having the exit parts thereof normally covered by spring pressed pawls 60. The springs 61 and 62 are provided one being connected to each of the two links 55 at the top of the spring and at the bottom thereof being connected to one of the two arms 63 mounted on a rod 64 and forming therewith a two-armed lever. One of the arms has projecting therefrom a pin 65 adapted to ride in a notch 66 of a lever 67 which is journaled on a pin 68. Connected to the lever 67 is a link 69, which is attached at its forward end to the retaining bar 70 used in this type of machine. This retaining bar is normally held in its forward position against the tension of spring 71 by the segmental detent 25, previously referred to. When the detent is raised, the retaining bar can then spring rearwardly under the influence of spring 71. Although there are two links 55 connected to the two flashes, there is only one link 69 and lever 67, and this link 69 is connected to the retaining bar 70 for the extreme right-hand bank of keys of the machine. The mechanism is in effect normally set to work on the "A" side. When the machine is operated, rotation of the disks 59 will cause the antifriction rollers 57 to move through the exits of the slots 58. After the first operation of the machine only one of the pins would be in its slot at any given time but no matter which pin was in the slot it will be forced by the cam portion thereof downwardly immediately after the starting of the machine. The other flash corresponding to the clerk's key which had been used at the previous operation will remain in concealing position. The antifriction rollers 57 will ride on the periphery of the disks 59 until the forward or entrance end of the cam slots 58 reach them. It will be remembered that the retaining bar 70 controls the tensioning of the springs 61 and 62. In the position shown spring 61 is tensioned while if the clerk's key had been operated and the retaining bar moved rearward its spring 71 would overpower the spring 62 and tension it at the same time releasing the tension of spring 61. In the position of the figure spring 61 will hold down the link 55 to which it is connected, thereby preventing the antifriction roller 57 thereon from rising into the entrance of the slot 58 corresponding thereto, but as spring 62 is not tensioned the other link 55 will rise under the energy of its spring 62$^a$ causing its antifriction roller 57 to enter the cam slot 58 and thereby permitting a return of the corresponding shutter 51 to the exhibiting position as in Fig. 2. This mechanism evidently provides for the result above indicated—that is, that both of the flashes shall be brought to concealing position at the beginning of each operation, this being a resultant of the exit of the slot 58, which depresses both of the links 55. When the operation is partly finished, one of the friction rollers 57 will be allowed to move into the slot 58 at the entrance part thereof, whereas the other friction roller will be compelled to remain depressed under tension of its spring 61 or 62, and will thereby remain depressed at the end of the operation. The clerk's key indicated by "B" in Fig. 1 controls the tensioning or loosening of springs 61 and 62, and thereby determines which flash shall remain in concealing position. It will be of course understood that if the "B" clerk's key is depressed, the result will be to withdraw the flash marked "Clerk A" and leave in sight the flash marked "Clerk B," and the reverse will be true if the "A" clerk's key is depressed.

Figure 1:
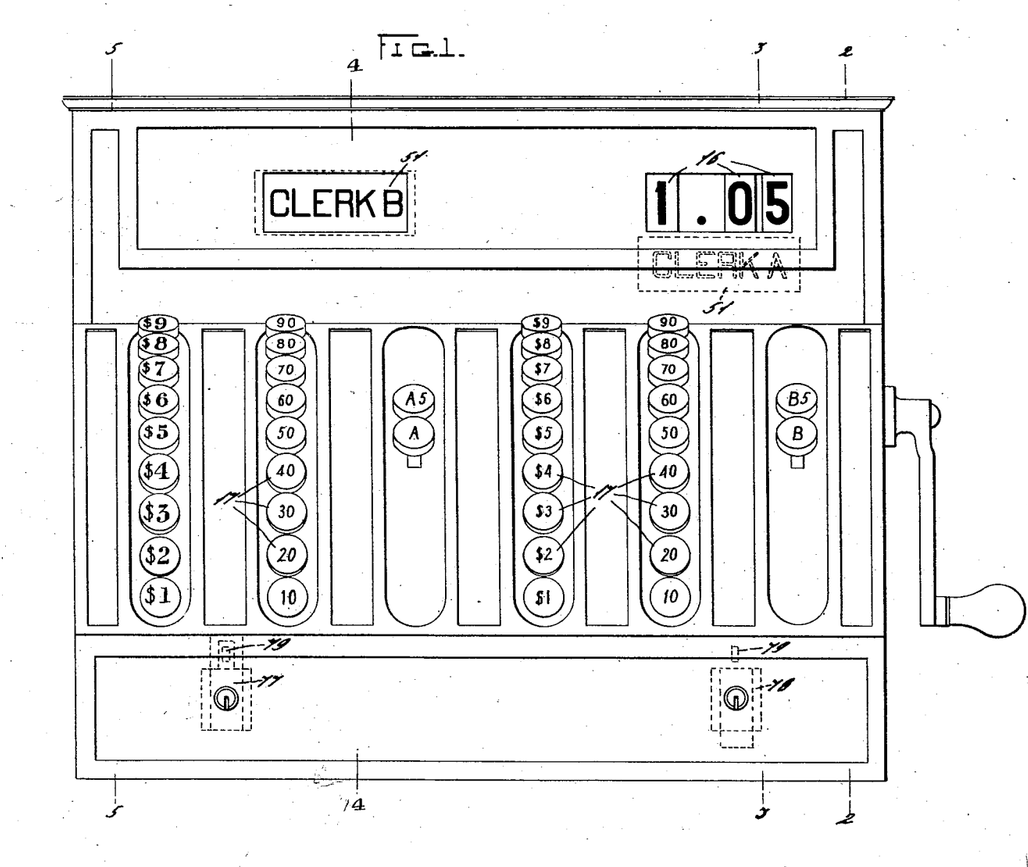
Figure 1 is a front view of the machine.

It may sometimes be desired by one of the clerks operating the machine to be able to lock his half thereof, as, for example, if he leaves the establishment for a short period. To accomplish this result, two locks 77 and 78, shown in Fig. 1, are adapted to control the movement of the detents 23. When a key is inserted in one or the other of the locks, and the bolt shot, the connecting bar 79 will move the detents 23 forwardly or rearwardly, depending on which of the two locks is operated, and thereby prevent an operation of the keys in one or the other half of the machine.

While the form of mechanism here shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is as follows;

1. In a machine of the class described, the combination with groups of manipulative devices such as keys, of segmental locking elements moved by said devices when actuated, and when so moved serving to retain said devices in actuated position, and devices rigidly constructed with camming edges engaged and moved by said segmental locking devices, certain of the camming edges being shaped to cause movement in a direction reverse to that caused by other of the said edges.

2. In a cash register, the combination with two banks of keys, a movable detent for each bank, and pivoted locking devices moved by each detent and serving to lock the remaining detent against movement.

3. In a cash register, the combination with a plurality of banks of keys, a detent for each bank moved by the keys and serving to lock the same; a shaft, a plurality of locking devices for the detents rigid with said shaft, and means on each detent for operating the locking devices.

4. In a cash register, the combination with an operating mechanism, of indicating devices controlled thereby, a plurality of shutters for concealing said indicators, special keys one for each shutter, and means controlled by said keys for causing the operating mechanism to retain the shutter corresponding to the actuated key in concealing position and to withdraw the remaining shutter from concealing position.

5. In a cash register, the combination with an operating mechanism, and indicators controlled thereby, of a plurality of shutters for concealing said indicators, special keys, one for each shutter, means actuated by said operating mechanism for moving the shutters to concealing position at each actuation, and means controlled by the special keys for causing the retention in concealing position of the shutter corresponding to the special key depressed.

6. In a cash register, the combination with an operating mechanism, and indicating devices controlled thereby, of a plurality of shutters for said indicators, a plurality of keys, one corresponding to each shutter, means actuated by the operating mechanism for moving all the shutters to concealing position during each actuation, and means controlled by said keys for causing the operating mechanism to retain the shutter corresponding to the actuated key in concealing position, and to withdraw the remaining shutters from concealing position.

7. In a cash register, the combination with an operating mechanism, and indicating devices controlled thereby, of a shutter for said device, means actuated by said operating mechanism for moving the shutter to concealing position at each actuation, a key corresponding to the shutter and means controlled by said key, permitting said shutter to return to exhibiting position at the end of an operation in which said key is idle.

8. In a cash register, the combination with an indicating mechanism, and entry determining devices controlling same, a shutter for said indicating mechanism having an identifying indication thereon, a key, and means caused to operate by depressing said key for holding said shutter in concealing position and thereby continuing the exhibition of the indication on said shutter.

9. In a cash register, the combination with an indicating mechanism, of entry determining devices controlling same, a special entry determining device and a shutter for concealing the indicating mechanism, said shutter being under the control of the special determining device and serving also as an identifying indicator.

10. In a machine of the class described, the combination with two sets of indicators, of two independent manipulative devices, concealing means for each set of indicators acting when in concealing position as identifying devices for said manipulative devices, and connections whereby the manipulative devices control the withdrawal of the concealing means from concealing position.

11. In a machine of the class described, the combination with two sets of indicators, of concealing means for each set of indicators acting as identifying devices in connection with the indicators of the other set, and manipulative devices having connections separately to control the withdrawal of the concealing means from concealing position.

12. In a cash register, the combination with value indicating mechanism, and means for actuating the same, of a shutter for said mechanism having an identifying indication thereon, means for moving said shutter to concealing position, and a special key and connections whose operation serves to cause retention of said shutter in concealing position and consequent exhibition of the indication on said shutter.

13. In a cash register, the combination with a plurality of banks of keys, of a detent for each bank, pivoted locking devices moved by one detent and serving to lock the remaining detents from operation, and independent devices for locking any detent.

14. In a machine of the class described, the combination with a plurality of sets of keys, each set containing two or more banks of keys, of means controlled by the keys of any set for preventing the operation of the keys of the remaining set, and additional means for locking any set when desired.

15. In a cash register, the combination with a main operating mechanism therefor and a device normally locking said mechanism, of a bank of keys, an obstruction to movement of said locking device constructed to be withdrawn by said keys, a second bank of keys, and means controlled thereby for moving said locking device when said obstruction has been withdrawn.

16. In a cash register, the combination with a main operating mechanism therefor and a device normally locking said mechanism, of an obstructing device normally preventing releasing movement of said locking device, manipulative devices for withdrawing said obstructing device, and other manipulative devices for moving said locking device to releasing position when said obstructing device is withdrawn.

17. In a cash register, the combination with a main operating mechanism therefor, and a device normally locking said mechanism, of an obstructing element normally preventing movement of said locking means, manipulative devices for withdrawing said obstructing element, spring means for moving said locking device to releasing position when said obstructing element is withdrawn and other manipulative devices controlling the operation of said spring means.

18. In a cash register, the combination with a main operating mechanism therefor and a normally inactive locking device normally locking said mechanism, manipulative devices for rendering said locking device active automatically to disable its locking effectivity, an obstructing device normally restraining such activity of the locking device, and other manipulative devices for withdrawing said obstructing device.

In testimony whereof I affix my signature in the presence of two witnesses.

EDMUND S. CHURCH.

Witnesses:
ROY C. GLASS,
CARL W. BEUST.

---

Copies of this patent may be obtained for five cents each, by addressing the "Commissioner of Patents, Washington, D. C."